United States Patent
Lee et al.

(10) Patent No.: US 11,051,003 B2
(45) Date of Patent: Jun. 29, 2021

(54) IMAGE PROCESSING METHOD AND APPARATUS FOR AUTOSTEREOSCOPIC THREE-DIMENSIONAL DISPLAY

(71) Applicant: SAMSUNG ELECTRONICS CO., LTD., Suwon-si (KR)

(72) Inventors: Seok Lee, Hwaseong-si (KR); Juyong Park, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/129,297

(22) Filed: Sep. 12, 2018

(65) Prior Publication Data

US 2019/0082168 A1 Mar. 14, 2019

(30) Foreign Application Priority Data

Sep. 12, 2017 (KR) .................. 10-2017-0116735

(51) Int. Cl.
*H04N 13/31* (2018.01)
*H04N 13/305* (2018.01)
*H04N 13/376* (2018.01)
*H04N 13/125* (2018.01)
(Continued)

(52) U.S. Cl.
CPC ............. *H04N 13/31* (2018.05); *G02B 30/00* (2020.01); *H04N 13/125* (2018.05); *H04N 13/305* (2018.05); *H04N 13/376* (2018.05); *H04N 13/383* (2018.05)

(58) Field of Classification Search
CPC .... H04N 13/31; H04N 13/376; H04N 13/125; H04N 13/383; H04N 13/305; G02B 27/22
See application file for complete search history.

(56) References Cited

U.S. PATENT DOCUMENTS

2009/0123030 A1* 5/2009 De La Barre .......... H04N 13/31
382/103
2009/0167639 A1 7/2009 Casner et al.
(Continued)

FOREIGN PATENT DOCUMENTS

EP 2648413 A2 10/2013
KR 10-2009-0035204 A 4/2009
(Continued)

OTHER PUBLICATIONS

Communication dated Oct. 24, 2018, issued by the European Patent Office in counterpart European Application No. 18193645.1.

*Primary Examiner* — Kee M Tung
*Assistant Examiner* — Khoa Vu
(74) *Attorney, Agent, or Firm* — Sughrue Mion, PLLC

(57) ABSTRACT

A three-dimensional (3D) image providing method and apparatus is provided. The 3D image providing method includes detecting an eye location of a viewer and providing a 3D image based on the detected eye location, in which the providing of the 3D image includes determining an image pixel value corresponding to a display pixel of a display panel, determining a luminance weight corresponding to the display pixel based on a ray direction of a ray output from the display pixel and the detected eye location, applying the luminance weight to the image pixel value corresponding to the display pixel, and outputting, through the display pixel, the image pixel value with the luminance weight applied thereto.

19 Claims, 11 Drawing Sheets

(51) Int. Cl.
    *G02B 30/00*     (2020.01)
    *H04N 13/383*     (2018.01)

(56) References Cited

U.S. PATENT DOCUMENTS

| | | | | |
|---|---|---|---|---|
| 2013/0162783 A1* | 6/2013 | Mishima | ............. | H04N 13/156 |
| | | | | 348/47 |
| 2013/0257928 A1* | 10/2013 | Lee | ............ | H04N 13/368 |
| | | | | 345/697 |
| 2014/0198188 A1* | 7/2014 | Izawa | ............ | H04N 13/106 |
| | | | | 348/49 |
| 2014/0292620 A1* | 10/2014 | Lapstun | ............ | G02F 1/33 |
| | | | | 345/6 |
| 2015/0304644 A1 | 10/2015 | Kim et al. | | |

FOREIGN PATENT DOCUMENTS

| | | |
|---|---|---|
| KR | 10-2011-0024739 A | 3/2011 |
| KR | 10-2011-0045654 A | 5/2011 |
| KR | 10-2014-0136211 A | 11/2014 |
| KR | 10-2016-0079555 A | 7/2016 |
| KR | 10-2017-0029210 A | 3/2017 |
| KR | 10-2017-0029364 A | 3/2017 |
| WO | 2015173038 A1 | 11/2015 |

* cited by examiner

IMAGE PROCESSING METHOD AND APPARATUS FOR AUTOSTEREOSCOPIC THREE-DIMENSIONAL DISPLAY

CROSS-REFERENCE TO RELATED APPLICATIONS

This application claims priority from Korean Patent Application No. 10-2017-0116735 filed on Sep. 12, 2017 in the Korean Intellectual Property Office, the disclosure of which is incorporated herein by reference in its entirety.

BACKGROUND

1. Field

Methods and apparatuses consistent with example embodiments relate to image processing technology for an autostereoscopic three-dimensional (3D) display.

2. Description of the Related Art

To effectively express a three-dimensional (3D) image that provides a stereoscopic sense, images of different viewpoints may need to be provided respectively to both eyes of a viewer (also referred to as a user). A method of displaying different images to both eyes of a user may include, for example, a glass-type or stereoscopic method to obtain a desired image through filtering using polarization-based division, time division, or wavelength division of varying a wavelength of a primary color, and a glassless-type or autostereoscopic method to display an image at each viewpoint in a space using a 3D optical device such as, for example, a parallax barrier, a lenticular lens, and a directional backlight unit.

SUMMARY

Example embodiments provide methods and apparatuses that relate to image processing technology for an autostereoscopic three-dimensional (3D) display.

According to an aspect of an example embodiment, there is provided a 3D image providing method including detecting an eye location of a viewer, and providing a 3D image based on the detected eye location, wherein the providing of the 3D image includes determining an image pixel value corresponding to a display pixel included in a display panel, determining a luminance weight corresponding to the display pixel based on a ray direction of a ray output from the display pixel and the detected eye location, applying the determined luminance weight to the image pixel value corresponding to the display pixel, and outputting, through the display pixel, the image pixel value with the determined luminance weight applied thereto.

The determining the luminance weight based on at least one of a first reference value corresponding to a distance between a pass-through point of the ray direction and a location of a left eye of the viewer, or a second reference value corresponding to a distance between the ray direction and a location of a right eye of the viewer, the pass-through point of the ray direction being a location where the ray crosses a line passing through the location of the left eye and the location of the right eye.

The determining of the luminance weight may include determining a predefined luminance weight among a plurality of predefined luminance weights to be the luminance weight based on the at least one of the first reference value or the second reference value.

The determining of the luminance weight may include determining a first luminance weight to be the luminance weight corresponding to the display pixel in response to the first reference value being included in a first reference value range based on the location of the left eye or the second reference value being included in a second reference value range based on the location of the right eye.

The determining of the luminance weight may include determining a second luminance weight to be the luminance weight corresponding to the display pixel in response to the first reference value being outside of the first reference value range and the second reference value being outside of the second reference value range, wherein the first luminance weight is greater than the second luminance weight.

The magnitude of the first reference value range may be equal to a magnitude of the second reference value range.

The first reference value may correspond to a difference between the ray direction and a direction of a line from the display pixel towards the location of the left eye, and the second reference value may correspond to a difference between the ray direction and a direction of a line from the display pixel towards the location of the right eye.

The first reference value may be determined based on an angle between the ray direction and the direction of the line from the display pixel towards the location of the left eye, or a distance between the pass-through point of the ray direction and the location of the left eye, and the second reference value may be determined based on an angle between the ray direction and the direction of the line from the display pixel towards the location of the right eye, or a distance between the pass through point of the ray direction and the location of the right eye.

The luminance of the image pixel value to be output through the display pixel may be adjusted based on the luminance weight to be applied to the image pixel value.

The determining of the image pixel value may include allocating, to the display pixel, an image pixel value of one of a left-view image and a right-view image based on the detected eye location.

The determining of the image pixel value may further include adjusting a left luminance range of image pixels of the left-view image and a right luminance range of image pixels of the right-view image based on a predefined luminance scaling value, and adjusting a luminance value of each of the image pixels of the left-view image with the adjusted left luminance range and a luminance value of each of the image pixels of the right-view image with the adjusted right luminance range, based on a predefined crosstalk correction value.

The determining of the image pixel value may further include allocating the image pixel value of the left-view image with the adjusted left luminance value to the display pixel in response to a distance between a pass-through point of the ray direction and a location of a left eye of the viewer being smaller than a distance between the pass-through point of the ray direction and a location of a right eye of the viewer, the pass-through point of the ray direction being a location where the ray crosses a line passing through the location of the left eye and the location of the right eye, and allocating the image pixel value of the right-view image with the adjusted right luminance value to the display pixel in response to the distance between the pass-through point of the ray direction and the location of the right eye being smaller than the distance between the pass-through point of the ray direction and the location of the left eye.

A non-transitory computer-readable storage medium storing instructions that, when executed by a processor, may cause the processor to perform the 3D image providing method.

According to an aspect of another example embodiment, there is provided a 3D image providing apparatus including an eye location detector configured to detect an eye location of a viewer, a processor configured to generate a panel image based on the detected eye location, and a display panel configured to output a 3D image based on the generated panel image, wherein the processor is further configured to determine a luminance weight corresponding to a display pixel of the display panel based on a ray direction of a ray output from the display pixel and the detected eye location, apply the determined luminance weight to an image pixel value corresponding to the display pixel, and generate the panel image based on the image pixel value with the luminance weight applied thereto.

The processor may be further configured to determine the luminance weight based on at least one of a first reference value corresponding to a distance between the ray direction and a location of a left eye of the viewer, or a second reference value corresponding to a distance between the ray direction and a location of a right eye of the viewer.

The processor may be further configured to determine a predefined luminance weight among a plurality of predefined luminance weights to be the luminance weight corresponding to the display pixel based on at least one of the first reference value or the second reference value.

The processor may be further configured to adjust a left luminance range of image pixels of a left-view image and a right luminance range of image pixels of a right-view image based on a predefined luminance scaling value, and adjust a luminance value of each of the image pixels of the left-view image based on the adjusted left luminance range and a luminance value of each of the image pixels of the right-view image based on the adjusted right luminance range, based on a predefined crosstalk correction value.

The processor may be further configured to allocate an image pixel value of the left-view image with the adjusted left luminance value to the display pixel in response to a distance between a pass-through point of the ray direction and a location of a left eye of the viewer being smaller than a distance between the pass-through point of the ray direction and a location of a right eye of the viewer, the pass-through point of the ray direction being a location where the ray crosses a line passing through the location of the left eye and the location of the right eye, and allocate an image pixel value of the right-view image with the adjusted right luminance value to the display pixel in response to the distance between the pass-through point of the ray direction and the location of the right eye being smaller than the distance between the pass-through point of the ray direction and the location of the left eye.

The display panel may include a parallax barrier or a lenticular lens.

According to an aspect of another example embodiment, there is provided a 3D image providing method including detecting a right eye location and a left eye location of a viewer, and providing a 3D image based on the detected right eye location and the detected left eye location, wherein the providing of the 3D image includes determining an image pixel value corresponding to a display pixel included in a display panel by allocating an image pixel value of one of a left-view image and a right-view image to the display pixel based on the detected right eye location and the detected left eye location, adjusting a left luminance range of image pixels of the left-view image and a right luminance range of image pixels of the right-view image based on a predefined luminance scaling value, and adjusting a luminance value of each of the image pixels of the left-view image with the adjusted left luminance range and a luminance value of each of the image pixels of the right-view image with the adjusted right luminance range, based on a predefined crosstalk correction value, determining a luminance weight corresponding to the display pixel based on a ray direction of a ray output from the display pixel and the detected right eye location and the detected left eye location, applying the determined luminance weight to the image pixel value corresponding to the display pixel, and outputting, through the display pixel, the image pixel value with the determined luminance weight applied thereto.

The determining of the image pixel value may further include in response to a distance between a pass-through point of the ray direction and a location of a left eye of the viewer being smaller than a distance between the pass-through point of the ray direction and a location of a right eye of the viewer, allocating the image pixel value of the left-view image with the adjusted left luminance value to the display pixel, the pass-through point of the ray direction being a location where the ray crosses a line passing through the location of the left eye and the location of the right eye, and in response to the distance between the pass-through point of the ray direction and the location of the right eye being smaller than the distance between the pass-through point of the ray direction and the location of the left eye, allocating the image pixel value of the right-view image with the adjusted right luminance value to the display pixel.

BRIEF DESCRIPTION OF THE DRAWINGS

The above and/or other aspects will be more apparent and more readily appreciated from the following description of example embodiments, taken in conjunction with the accompanying drawings of which.

DETAILED DESCRIPTION

Figure 1:
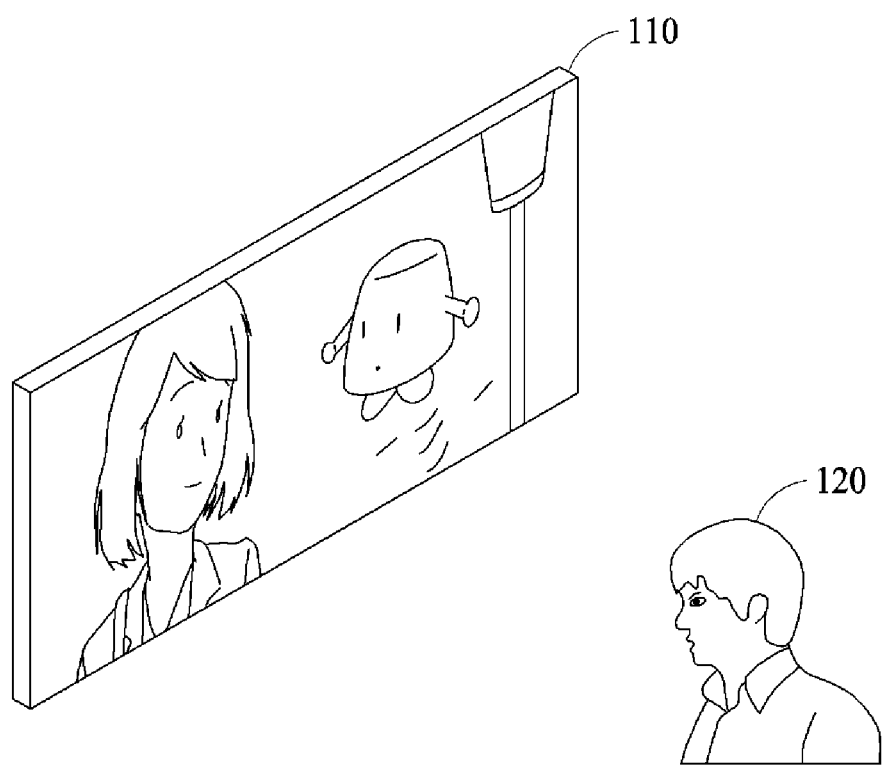
FIG. 1 is a diagram illustrating a three-dimensional (3D) image providing apparatus according to an example embodiment.

Reference will now be made in detail to example embodiments, examples of which are illustrated in the accompanying drawings, wherein like reference numerals refer to the like elements throughout. Example embodiments are described below in order to explain the present disclosure by referring to the figures.

The following structural or functional descriptions are exemplary to merely describe the example embodiments, and the scope of the example embodiments is not limited to the descriptions provided in the present disclosure. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

FIG. 1 is a diagram illustrating a three-dimensional (3D) image providing apparatus according to an example embodiment.

Referring to FIG. 1, a 3D image providing apparatus 110 may provide a 3D image to a viewer 120. The 3D image providing apparatus 110 refers to an apparatus configured to convert an input image to a 3D image, which is a stereoscopic image, and output the 3D image. The 3D image providing apparatus may be an autostereoscopic 3D display device that may embody such a stereoscopic image using a 3D optical device such as, for example, a parallax barrier and a lenticular lens. The 3D image providing apparatus 110 may perform 3D rendering to generate a panel image to be transmitted to a display panel, convert the generated panel image to the stereoscopic image through the 3D optical device, and output the stereoscopic image. The display panel may include a display module, for example, a liquid crystal display (LCD), a light-emitting diode (LED), an organic LED (OLED), and the like. The 3D image providing apparatus 110 may provide the viewer 120 a stereoscopic sense by allowing the viewer 120 to view different images with a left eye and a right eye of the viewer 120, respectively. The 3D image providing apparatus 110 may be any one of various types of display devices that may output a 3D image autostereoscopically or without glasses. For example, the 3D image providing apparatus 110 may be of any type including, for example, a 3D television (TV), a glass-type wearable device, a 3D head-up display (HUD), a monitor, a tablet computer, a smartphone, a mobile device, a smart home appliance, etc.

Figure 2:
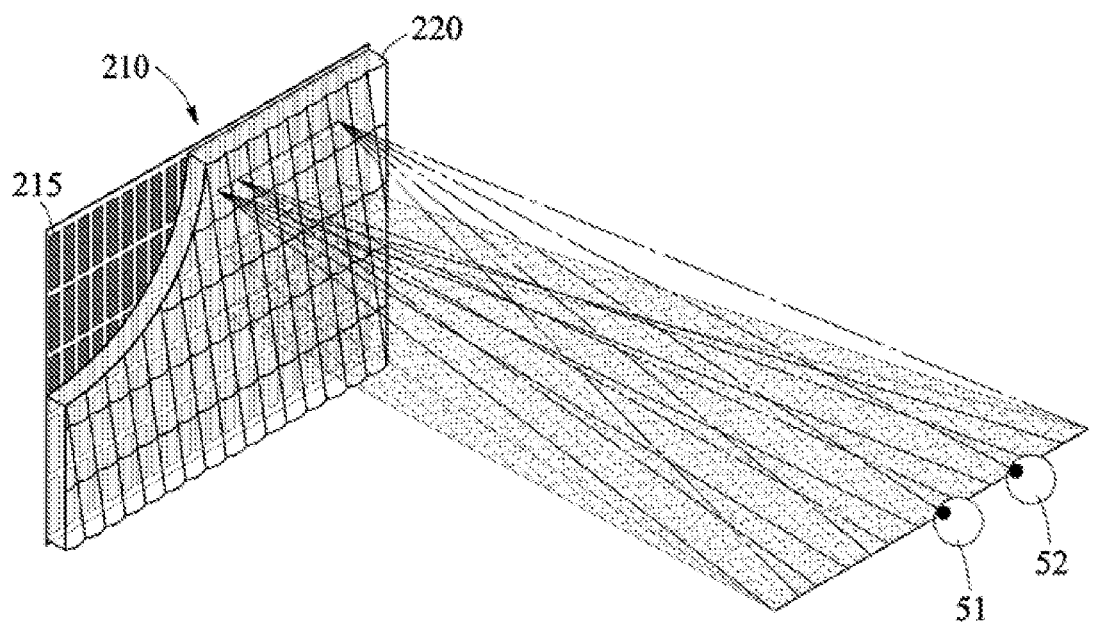
FIG. 2 is a diagram illustrating a conversion process to generate a 3D image according to an example embodiment.

FIG. 2 is a diagram illustrating a conversion process to generate a 3D image according to an example embodiment.

Referring to FIG. 2, a 3D image providing apparatus may output light, or a ray of light, that is output from each of display pixels 215 of a display panel 210 to a 3D space in a plurality of viewing directions through a 3D optical device 220. The rays output from the display pixels 215 may form a lightfield. A display pixel is included in the display panel 210, which may output a pixel value of an image pixel, or an image pixel value. An image pixel is included in a panel image, which may have an image pixel value to be output through a display pixel corresponding to the image pixel. The display pixel may be provided in a form of hardware, and the image pixel may be provided in a form of data. The ray of light to be output from each of the display pixels 215 may be transmitted in a certain direction through the 3D optical device 220.

The 3D optical device 220 may include, for example, a lenticular lens as illustrated in FIG. 2, or a parallax barrier. The lenticular lens or the parallax barrier may be designed to obliquely cross an array of the display pixels 215 included in the display panel 210. An autostereoscopic 3D display, such as the 3D image providing apparatus, may emit images of different viewpoints to both eyes of a viewer, for example, a left eye 51 and a right eye 52 of a viewer such that the viewer experiences a stereoscopic sense or a 3D effect. For example, the 3D image providing apparatus may allow the viewer to view a first viewpoint image with the left eye 51 and a second viewpoint image with the right eye 52, and thus provide a stereoscopic 3D image to the viewer. The stereoscopic sense may be generated by, for example, a binocular parallax.

When the 3D image providing apparatus provides a 3D image, the 3D image providing apparatus may track a viewpoint or an eye location of the viewer using, for example, a camera, and render the 3D image in real time based on the tracked viewpoint or eye location. Thus, the 3D image providing apparatus may function as a viewpoint tracking autostereoscopic 3D display. Such a viewpoint tracking autostereoscopic 3D display may render, in real time, a 3D image based on a viewing location of the viewer, and output two viewpoint images including a left-view image and a right-view image to the viewing location.

The 3D image providing apparatus may render a 3D image in real time based on a viewing location of the viewer, and thus enable real-time processing of the 3D image. According to an example embodiment, an array of image pixels included in a panel image may be provided in a form of a combination of a pixel value of the left-view image and a pixel value of the right-view image. The two viewpoint images—the left-view image and the right-view image— may form a lightfield, and be output to a viewing region through a 3D optical device. An image into which the left-view image output in a plurality of directions is merged may be viewed by a left eye of the viewer, and an image into which the right-view image output in a plurality of directions is merged may be viewed by a right eye of the viewer.

Examples to be described hereinafter may be applied to enhance a quality of a 3D image to be output through the viewpoint tracking autostereoscopic 3D display. For example, a crosstalk of the 3D image that may be viewed by both eyes of a viewer may be reduced. The crosstalk may occur when an image to be viewed by a left eye of a viewer is actually viewed by a right eye of the viewer or an image to be viewed by the right eye is actually viewed by the left eye, and may be caused by an incomplete separation between the image to be viewed by the left eye and the image to be viewed by the right eye. In general, there are two main causes of such a crosstalk occurring in the autostereoscopic 3D display. One type of crosstalk is an offset crosstalk caused by diffraction or scattering of light that may be generated when light is transmitted from the display through a 3D optical device, adhesive layer such as glue, or a display pixel structure. The offset crosstalk may occur evenly throughout a display panel irrespective of a location of the viewer. Second type of crosstalk is a 3D pixel crosstalk that may be caused due to an error occurring in designing or manufacturing a 3D optical device. The 3D pixel crosstalk may occur due to an error of, for example, a slit size of a parallax barrier, or a slanted angle or a lens aberration of a lenticular lens.

The crosstalk may greatly affect a quality of a 3D image, and thus it is desirable to reduce the crosstalk. The viewpoint tracking autostereoscopic 3D display may reduce the crosstalk through image processing to be described hereinafter. According to an example embodiment, the viewpoint tracking autostereoscopic 3D display may receive a luminance scaling value and a crosstalk correction value as parameters, and perform 3D rendering based on the parameters to reduce an influence of an offset crosstalk and enable real-time processing. In addition, in the real-time 3D rendering for each image pixel, the viewpoint tracking autostereoscopic 3D display may adjust a luminance component to reduce an influence of a 3D pixel crosstalk. According to an example embodiment, in the 3D rendering, the viewpoint tracking autostereoscopic 3D display may reduce a complexity of image processing and enable high-speed processing through parallel processing for each image pixel. Hereinafter, a 3D image providing method to be performed by the 3D image providing apparatus will be described in greater detail with reference to the following drawings.

Figure 3:
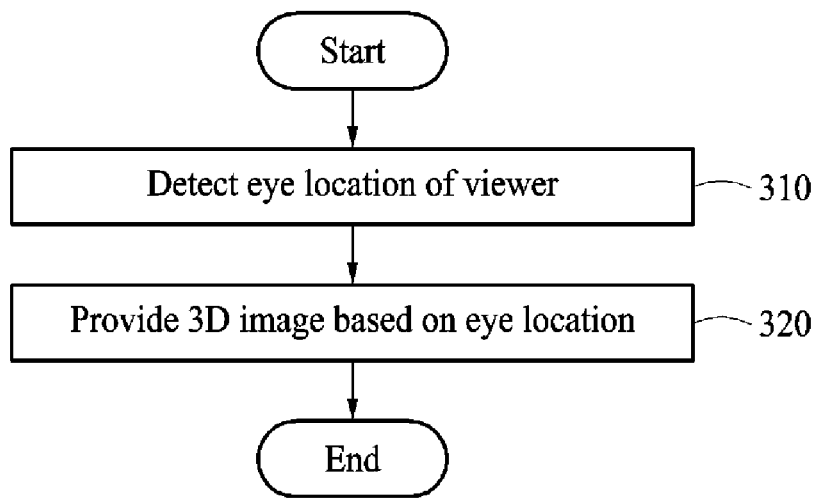
FIGS. 3 through 5 are flowcharts illustrating a 3D image providing method according to an example embodiment.
Figure 4:
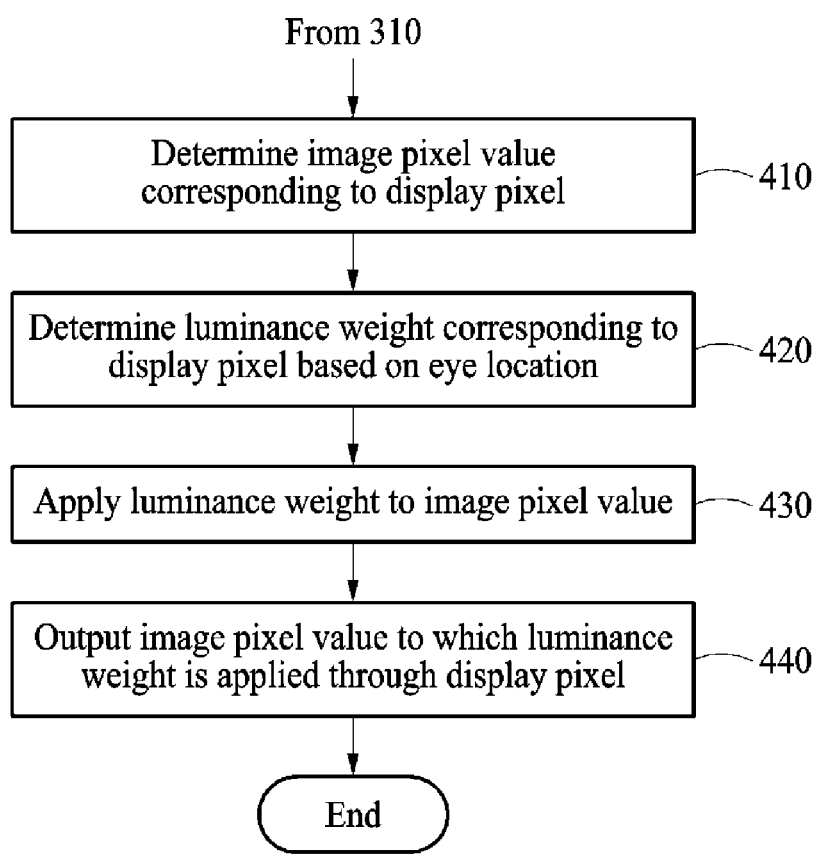
Figure 5:
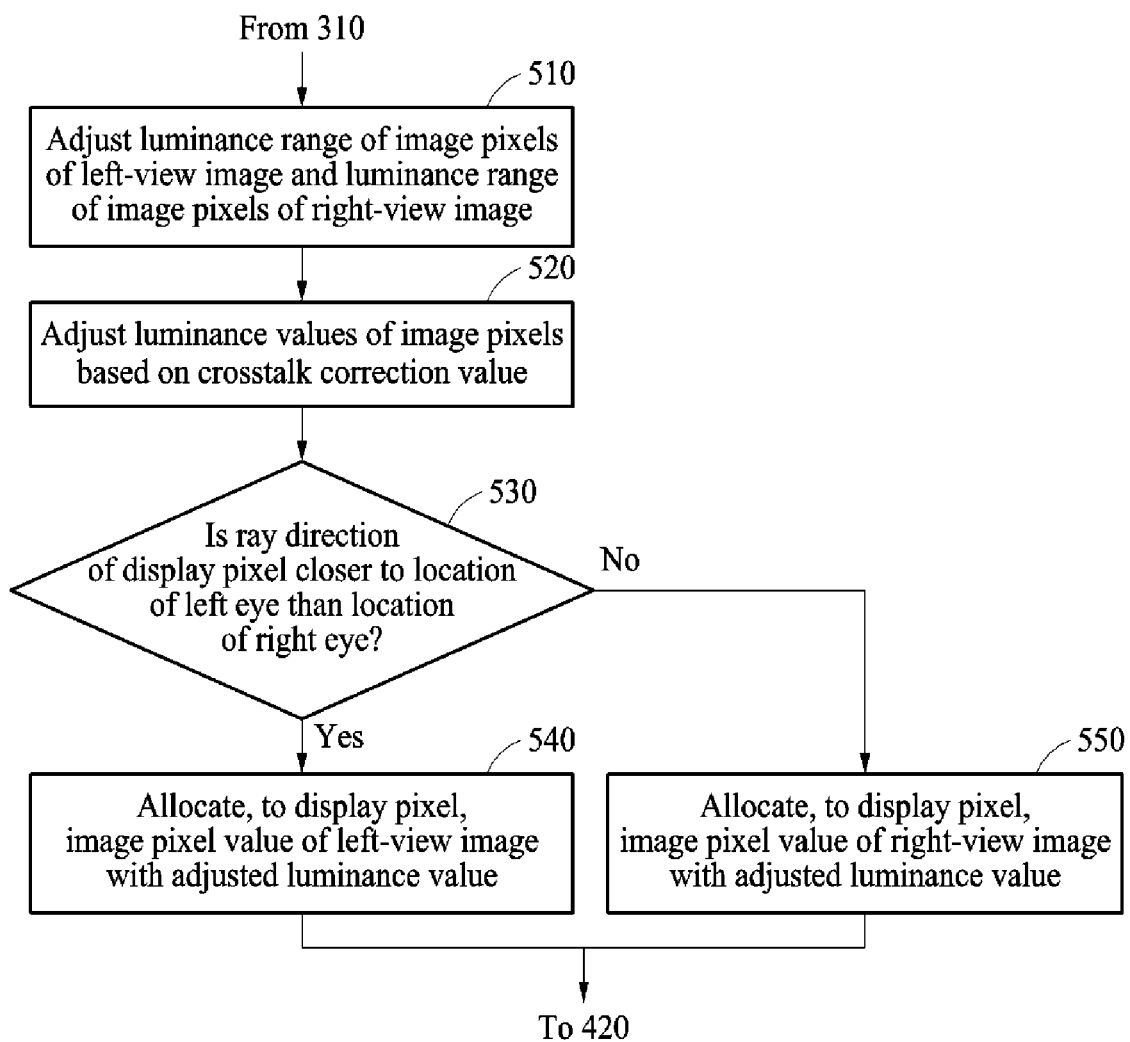

FIGS. 3 through 5 are flowcharts illustrating a 3D image providing method according to an example embodiment.

Referring to FIG. 3, in operation 310, a 3D image providing apparatus detects an eye location of a viewer. The 3D image providing apparatus determines the eye location of the viewer by capturing an image in front of the 3D image providing apparatus using a camera, and analyzing the captured image. For example, the 3D image providing apparatus may detect a feature point associated with an eye region in the image captured by the camera, and determine the eye location of the viewer based on a location of the detected feature point. The 3D image providing apparatus may also determine the eye location using a neural network-based detector that is trained to output an eye location from an input image. However, embodiments are not limited thereto, and the 3D image providing apparatus may detect the eye location using other methods.

In operation 320, the 3D image providing apparatus provides a 3D image to the viewer based on the detected eye location. As described above, the 3D image providing apparatus may operate as a viewpoint tracking autostereoscopic 3D display, and thus may render the 3D image based on the eye location of the viewer. When a same content is to be output, a configuration of a panel image to be output through a display panel may vary based on the eye location of the viewer. That is, based on the eye location of the viewer, whether an image pixel value of a left-view image or an image pixel value of a right-view image is allocated to a current display pixel may be determined. Rendering of the 3D image may be performed separately for each display pixel based on a location of a left eye of the viewer and a location of a right eye of the viewer, and on a ray direction of a ray output from each display pixel. Hereinafter, how the 3D image is provided by the 3D image providing apparatus will be described in greater detail with reference to FIG. 4.

FIG. 4 is a flowchart illustrating a method of providing a 3D image by a 3D image providing apparatus according to an example embodiment.

Referring to FIG. 4, in operation 410, the 3D image providing apparatus determines an image pixel value corresponding to a display pixel of a display panel. The 3D image providing apparatus allocates an image pixel value of one of a left-view image and a right-view image to each display pixel based on a detected eye location. For example, when a ray direction of a ray output from a display pixel, or a ray direction of a display pixel, is closer to a location of a left eye of a viewer than a location of a right eye of the viewer, the 3D image providing apparatus may allocate the image pixel value of the left-view image to the display pixel. Conversely, when the ray direction of the display pixel is closer to the location of the right eye than the location of the left eye, the 3D image providing apparatus may allocate the image pixel value of the right-view image to the display pixel.

According to an example, to further reduce a crosstalk component from a 3D image, a series of image preprocessing processes may be performed first. For example, the 3D image providing apparatus may adjust a luminance range of image pixel values of the left-view image and the right-view image that are input images, and correct a crosstalk to reduce an offset crosstalk component. Such a process will be described in greater detail with reference to FIG. 5.

In operation 420, the 3D image providing apparatus determines a luminance weight corresponding to the display pixel based on a ray direction of the display pixel and the eye location detected in operation 310. For example, when the ray direction of the display pixel is closer to the location of the left eye or the right eye, the 3D image providing apparatus may allocate a greater luminance weight to the display pixel. Conversely, when the ray direction of the display pixel is farther away from the location of the left eye and the location of the right eye, or the ray direction of the display pixel is closer to a middle location between the left eye and the right eye, the 3D image providing apparatus may allocate a lower luminance weight to the display pixel.

According to an example embodiment, the 3D image providing apparatus may determine the luminance weight based on at least one of a first reference value indicating a closeness between the ray direction of the display pixel and the location of the left eye, and a second reference value indicating a closeness between the ray direction of the display pixel and the location of the right eye. The first reference value corresponds to a difference between the ray direction of the display pixel and a direction from the display pixel towards the left eye of the viewer, and the second reference value corresponds to a difference between the ray direction of the display pixel and a direction from the display pixel towards the right eye of the viewer. For example, the first reference value may be determined based on an angle $\Theta L$ between the ray direction of the display pixel and a direction of a line from the display pixel towards the location of the left eye or a distance $dL$ between the ray direction, which corresponds to a distance between a pass-through point through which the ray direction passes on a straight line passing through a center location of the left eye and a center location of the right eye, and the location of the left eye. The second reference value may be determined based on an angle $\Theta R$ between the ray direction of the display pixel and a direction of a line from the display pixel towards the location of the right eye or a distance $dR$ between the ray direction and the location of the right eye. As the distance between the ray direction of the display pixel and the location of the left eye decreases, the first reference value may decrease. As the distance between the ray direction of the display pixel and the location of the right eye decreases, the second reference value may decrease.

According to an example embodiment, the 3D image providing apparatus may determine, to be the luminance weight corresponding to the display pixel, among predefined different luminance weights based on at least one of the first reference value or the second reference value. For example, when the first reference value is included in a first reference value range based on the location of the left eye or the second reference value is included in a second reference value range based on the location of the right eye, the 3D image providing apparatus may determine a first luminance weight to be the luminance weight corresponding to the display pixel. Conversely, when the first reference value is not included in the first reference value range and the second reference value is not included in the second reference value range, the 3D image providing apparatus may determine a second luminance weight to be the luminance weight corresponding to the display pixel. Here, a magnitude of the first reference value range may be equal to a magnitude of the second reference value range, and the first luminance weight may be greater than the second luminance weight. Also, the first reference value being included in the first reference value range or the second reference value being included in the second reference value range may indicate that the ray direction of the display pixel is closer to the left eye or the right eye. In such a case, a greater luminance weight may be allocated to the display pixel.

For example, a reference value may correspond to a difference in distance |dR−dL| between a distance from a ray direction and a location to a left eye from a ray direction and a distance to a right eye from the ray. When |dR−dL| is within a range from 0 to an interpupillary distance (IPD), a corresponding luminance weight may be from a minimum value 50%, when it is 0 and gradually increase to 100% from point where the distance is IPD/2. Similarly, a luminance weight may be applied based on a change in a difference between the angles |ΘR−ΘL|. When a 100% luminance weight is allocated, an image pixel value with an original luminance may be output through a corresponding display pixel without reducing the luminance of the image pixel value.

Also, the first reference value not being included in the first reference value range, and the second reference value not being included in the second reference value range may indicate that the ray direction of the display pixel is far away from the left eye and the right eye. In such a case, a smaller luminance weight may be allocated to the display pixel. For example, when a 50% luminance weight is allocated, a luminance of an image pixel value may be output through a corresponding display pixel by reducing the luminance of the image pixel value to 50%. For example, when the ray direction of the display pixel is close to the middle location between the left eye and the right eye, a smaller luminance weight may be allocated. Here, the luminance weight may be determined based on a magnitude of the first reference value or the second reference value. For example, the luminance weight may be determined to be one of predefined values, for example, 50%, 60%, . . . , 90%, and 100%, or determined based on a predefined function. Through such a process, a crosstalk may be reduced by reducing or preventing the right-view image from being viewed by the left eye or the left-view image from being viewed by the right eye.

In operation 430, the 3D image providing apparatus applies the luminance weight determined in operation 420 to the image pixel value corresponding to the display pixel. A luminance of the image pixel value to be output through the display pixel may be adjusted based on the luminance weight applied to the image pixel value. For example, in a case of a 100% luminance weight, an image pixel value with an original luminance may be output. In a case of a luminance weight less than 100%, an image pixel value with a luminance less than an original luminance may be output.

In operation 440, the 3D image providing apparatus outputs the image pixel value to which the luminance weight is applied through the display pixel. As described above, the 3D image providing apparatus may determine a luminance weight corresponding to each display pixel and output an image pixel value to which the determined luminance weight is applied through a corresponding display pixel to output a 3D image with a reduced crosstalk component.

FIG. 5 is a flowchart illustrating a method of determining an image pixel value to be allocated to a display pixel according to an example embodiment. As described hereinafter, a 3D image providing apparatus may receive a luminance scaling value and a crosstalk correction value as parameters, and correct an offset crosstalk using the parameters.

Referring to FIG. 5, in operation 510, the 3D image providing apparatus adjusts a luminance range of image pixels of a left-view image and a luminance range of image pixels of a right-view image based on a predefined luminance scaling value to maintain a margin range. According to an example embodiment, the luminance scaling value may include information associated with at least one of a minimum luminance value or a maximum luminance value of the image pixels. The 3D image providing apparatus may scale the luminance range of the image pixels based on the minimum luminance value and/or the maximum luminance value in the luminance scaling value.

For example, when the luminance range of the image pixels is 0 to 255, the 3D image providing apparatus may scale the luminance range of the image pixels to be 20 to 230 based on the luminance scaling value. After the scaling is performed, the minimum luminance value of the image pixels may be adjusted to be greater than or equal to 20, and the maximum luminance value of the image pixels may be adjusted to be less than or equal to 230. Such a scaling may be performed to secure a margin of image pixel values in a following process of adjusting an image pixel value.

In operation 520, the 3D image providing apparatus adjusts a luminance value of each of the image pixels of the left-view image and the right-view image with the luminance range adjusted in operation 510 based on a predefined crosstalk correction value. The 3D image providing apparatus may extract a luminance value by converting an image pixel value of each of the image pixels in a red, green, blue (RGB) color space to a luminance space through gamma decoding, and subtract a crosstalk component from the luminance value by applying the crosstalk correction value to the luminance value. For example, when the predefined crosstalk correction value is 3%, a luminance value corresponding to 3% of an original luminance value may be subtracted from the luminance value by applying the crosstalk correction value to the luminance value. The 3D image providing apparatus may then convert again, from the luminance space to the RGB color space, the image pixel value to which the crosstalk correction value is applied through gamma encoding. Through operations 510 and 520, the luminance range of the image pixels of the left-view image and the right-view image may be scaled, and the luminance value may be adjusted to correct a crosstalk.

In operation 530, the 3D image providing apparatus determines which of a location of a right eye of a viewer and a location of a left eye of the viewer is closer to a ray direction of a display pixel. In operation 540, in response to the pass-through point of the ray direction of the display pixel being closer to the location of the left eye than the location of the right eye, the 3D image providing apparatus allocates, to the display pixel, an image pixel value of the left-view image with the luminance value adjusted in operation 520. In operation 550, in response to the ray direction of the display pixel being closer to the location of the right eye than the location of the left eye, the 3D image providing apparatus allocates, to the display pixel, an image pixel value of the right-view image with the luminance value adjusted in operation 520. The 3D image providing apparatus may allocate an image pixel value to each of all display pixels, and generate a panel image based on the allocation.

Figure 6A:
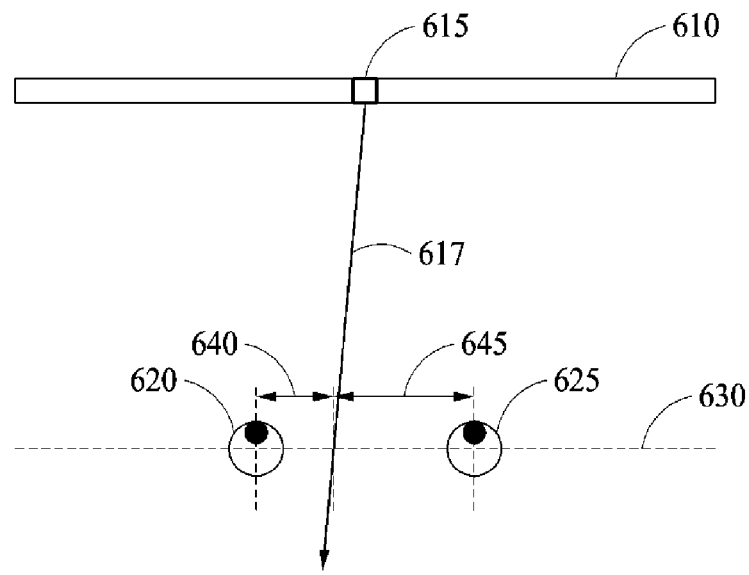
FIGS. 6A and 6B are diagrams illustrating examples determining a first reference value and a second reference value based on a ray direction of a display pixel and an eye location of a viewer according to an example embodiment.
Figure 6B:
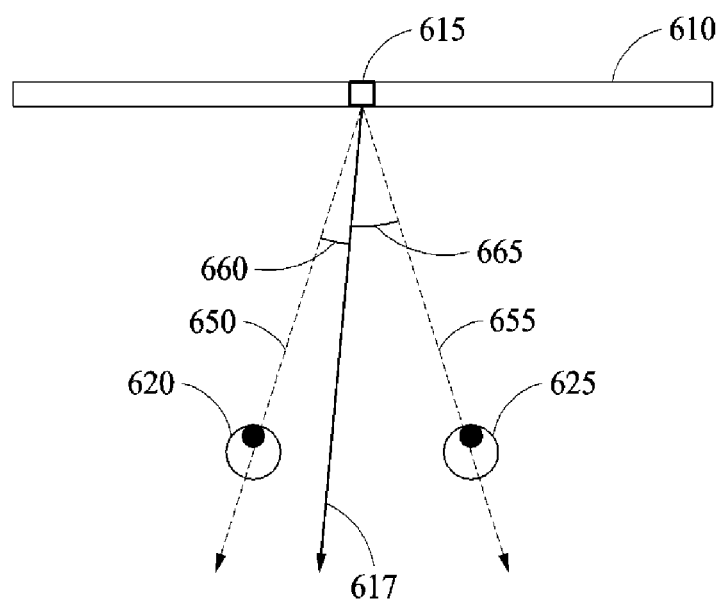

FIGS. 6A and 6B are diagrams illustrating examples of determining a first reference value and a second reference value based on a ray direction of a display pixel and an eye location according to an example embodiment.

Referring to FIG. 6A, a ray output from a display pixel 615 included in a display panel 610 proceeds in a ray direction 617 by a 3D optical device. The ray direction 617 of the display pixel 615 may be defined by a structural characteristic of the 3D optical device. When a location of a left eye 620 of a viewer and a location of a right eye 625 of the viewer are determined, a 3D image providing apparatus determines a first reference value indicating a closeness between the ray direction 617 of the display pixel 615 and the location of the left eye 620, and a second reference value indicating a closeness between the ray direction 617 of the display pixel 615 and the location of the right eye 625.

For example, the 3D image providing apparatus determines a pass-through point through which the ray direction 617 passes on a straight line 630 passing through a center location of the left eye 620 and a center location of the right eye 625. The 3D image providing apparatus determines a distance 640 between a location of the pass-through point and the location of the left eye 620 to be the first reference value, and a distance 645 between the location of the pass-through point and the location of the right eye 625 to be the second reference value. The 3D image providing apparatus compares the distance 640 and the distance 645 and determines whether the ray direction 617 of the display pixel 615 is closer to the left eye 620 or the right eye 625. As illustrated in FIG. 6A, the distance 640 is less than the distance 645, and thus the 3D image providing apparatus determines that the ray direction 617 is closer to the left eye 620.

Referring to FIG. 6B, each of the first reference value and the second reference value may be determined based on an angle difference. As illustrated, an angle 660 formed between a direction of a line 650 proceeding from the display pixel 615 towards the location of the left eye 620 and the ray direction 617 of the ray output from the display pixel 615 is determined to be the first reference value. In addition, an angle 665 formed between a direction of a line 655 proceeding from the display pixel 615 towards the location of the right eye 625 and the ray direction 617 of the ray output from the display pixel 615 is determined to be the second reference value. The 3D image providing apparatus compares the angle 660 and the angle 665, and determines whether the ray direction 617 of the display pixel 615 is closer to the left eye 620 or the right eye 625. As illustrated in FIG. 6B, the angle 660 is less than the angle 665, and thus the 3D image providing apparatus determines that the ray direction 617 is closer to the left eye 620.

Figure 7:
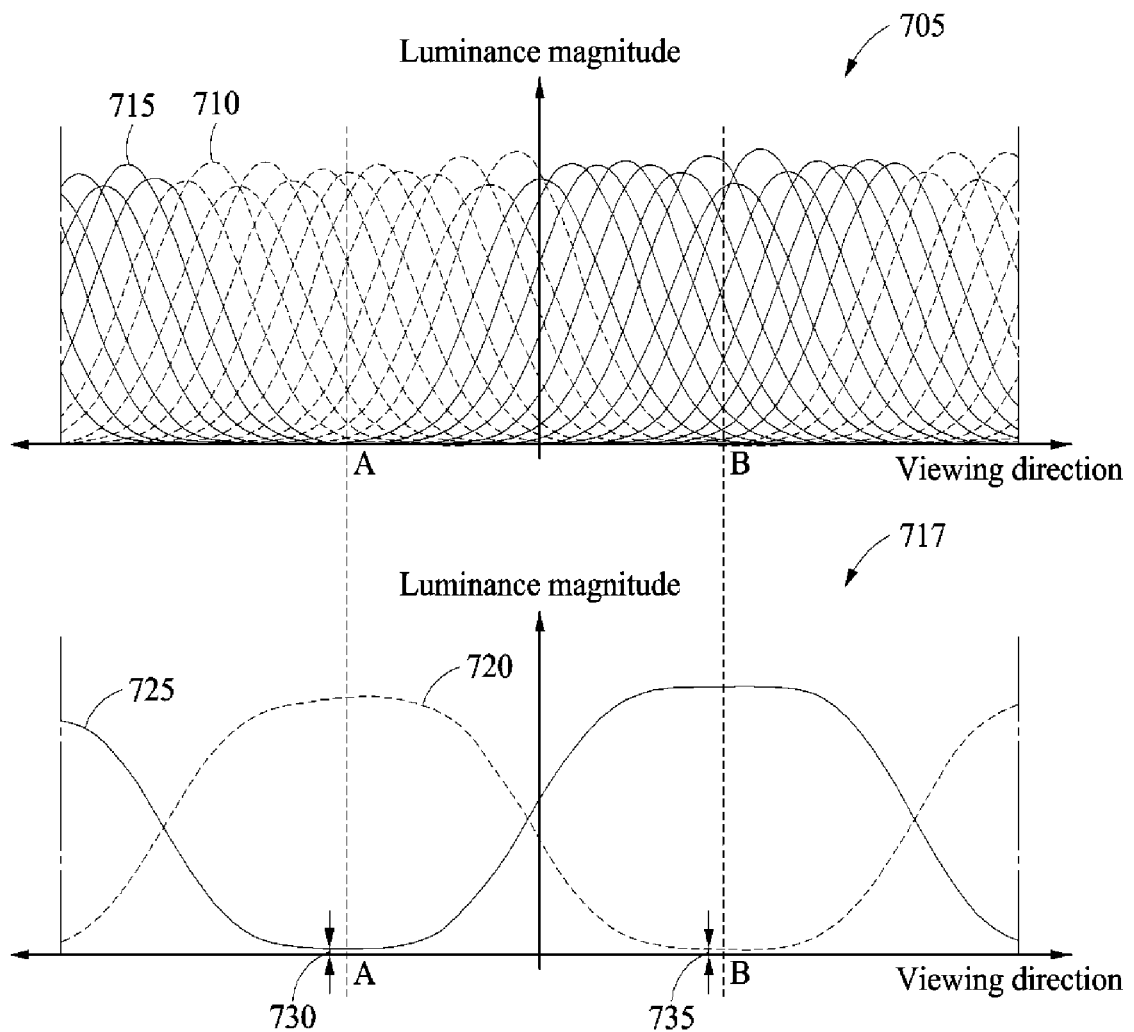
FIG. 7 is a diagram illustrating an example of merging viewpoint information in a tracking-type autostereoscopic 3D display device according to an example embodiment.

FIG. 7 is a diagram illustrating an example of merging viewpoint information in a viewpoint tracking autostereoscopic 3D display device according to an example embodiment.

FIG. 7 illustrates a viewing direction-based luminance profile 705 indicated for each of viewing directions, and a luminance profile 717 in which luminance profiles of the viewing directions are merged into a luminance profile of a left viewpoint and a luminance profile of a right viewpoint. In the luminance profile 705, a broken line 710 indicates a luminance distribution characteristic of each of viewing directions to which a left-view image is output, and a solid line 715 indicates a luminance distribution characteristic of each of viewing directions to which a right-view image is output. The luminance profile 717 is obtained by merging the luminance distribution characteristics indicated in the luminance profile 705 based on the left viewpoint and the right viewpoint. In the luminance profile 717, "A" indicates a location of a left eye of a viewer, and "B" indicates a location of a right eye of the viewer. By merging viewpoint information based on the location of the left eye and the location of the right eye, a crosstalk may be reduced. However, referring to the luminance profile 717, a luminance component 725 of the right-view image, in addition to a luminance component 720 of the left-view image output to various viewing directions, may also reach the left eye. Here, a luminance component 730 of the right-view image that reaches the location of the left eye may correspond to a crosstalk component. Also, when the luminance component 720 of the left-view image reaches the right eye, a luminance component 735 of the left-view image that reaches the location of the right eye may also correspond to a crosstalk component. Such crosstalk components may be reduced using a luminance weight described herein.

FIGS. 8A and 8B, and FIGS. 9A and 9B are diagrams illustrating examples of determining a luminance weight based on an eye location of a viewer according to an example embodiment.

Figure 8A:
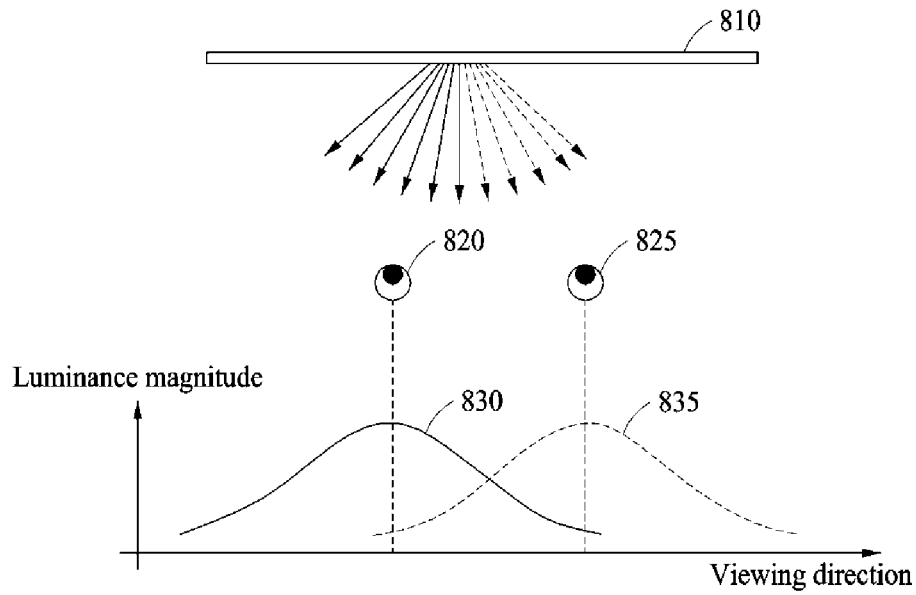
FIGS. 8A and 8B, and FIGS. 9A and 9B are diagrams illustrating examples of determining a luminance weight based on an eye location of a viewer according to an example embodiment.

Referring to FIG. 8A, a 3D image output from a display panel 810 reaches a left eye 820 and a right eye 825 of a viewer. A 3D image providing apparatus allocates an image pixel value of a left-view image or an image pixel value of a right-view image to a display pixel based on a ray direction of a ray output from each of display pixels of the display panel 810 and on a location of the left eye 820 and a location of the right eye 825. FIG. 8A also illustrates a luminance profile 830 of the left-view image merged at the location of the left eye 820 and a luminance profile 835 of the right-view image merged at the location of the right eye 825. As described with reference to FIG. 7, an unintended viewpoint image may be transmitted to each of the location of the left eye 820 and the location of the right eye 825, and thus a crosstalk may occur.

Figure 8B:
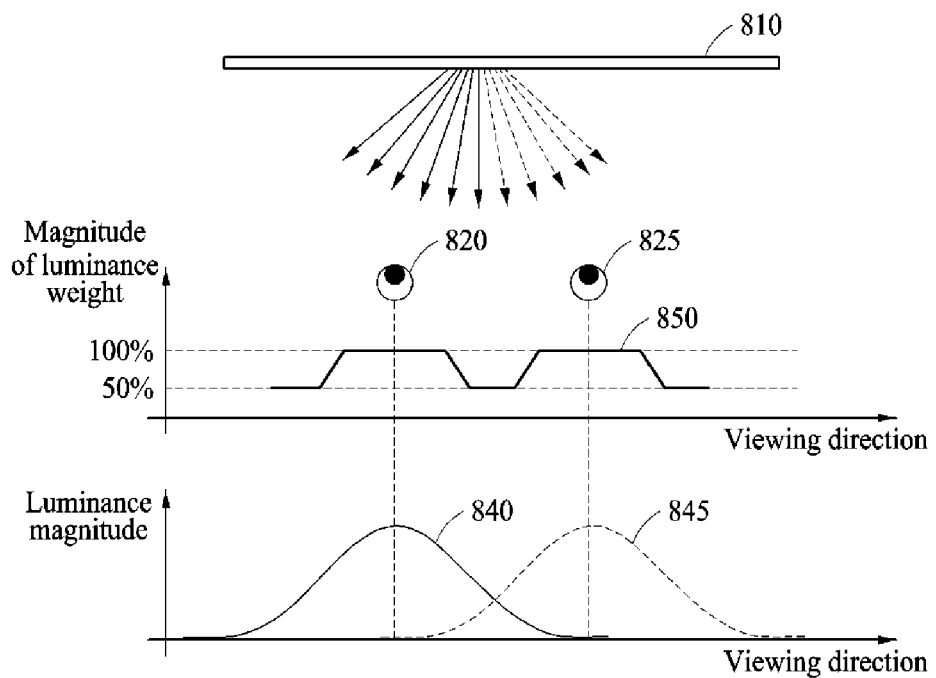

Referring to FIG. 8B, the 3D image providing apparatus may reduce such a crosstalk by applying a luminance weight to an image pixel value to be allocated to each of display pixels included in the display panel 810. The 3D image providing apparatus may determine a magnitude of a luminance weight corresponding to each of the display pixels based on a ray direction of each of the display pixels and the locations of the left eye 820 and the right eye 825. When mapping an image pixel value to a display pixel, the 3D image providing apparatus may compare a ray direction of the display pixel and the locations of the left eye 820 and the right eye 825, and determine a magnitude of a luminance weight to be applied to the image pixel value. For example, when the ray direction is closer to the location of the left eye 820 or the right eye 825, the 3D image providing apparatus may determine the magnitude of the luminance weight to be 100% such that an original luminance value of the image pixel value is to be maintained. Conversely, when the ray direction is farther away from the location of the left eye 820 or the right eye 825, the 3D image providing apparatus may decrease the luminance value of the image pixel value by applying a relatively low luminance weight.

According to an example embodiment, the 3D image providing apparatus may determine a first reference value and a second reference value based on a ray direction of a display pixel and each of the locations of the left eye 820 and the right eye 825. When the first reference value is included in a first reference value range based on the location of the left eye 820, or the second reference value is included in a second reference value range based on the location of the right eye 825, a 100% luminance weigh may be applied to an image pixel value to be allocated to the display pixel. However, when the first reference value is not included in the first reference value range and the second reference value is not included in the second reference value range, a luminance weight less than 100%, for example, 50%, may be applied to the image pixel value, and thus the image pixel value with a luminance value less than an original luminance value may be output. Thus, the 3D image providing apparatus may determine a luminance weight corresponding to each of the display pixels based on a ray direction of each of the display pixels and the locations of the left eye 820 and the right eye 825. The 3D image providing apparatus may then apply the determined luminance weight to an image pixel value to be output through each of the display pixels such that an influence of a display pixel that does not directly project an image to the left eye 820 and the right eye 825 may be reduced and a crosstalk component may also be reduced. FIG. 8B also illustrates a luminance weight 850 that is applied to each of the display pixels, and a luminance profile 840 of the left-view image merged at the location of the left eye 820 and a luminance profile 845 of the right-view image merged at the location of the right eye 825. By comparing the luminance profiles 840 and 845 illustrated in FIG. 8B and the luminance profiles 830 and 835 illustrated in FIG. 8A, it is verified that a crosstalk component is reduced at each of the locations of the left eye 820 and the right eye 825 by applying the luminance weight 850.

Figure 9A:
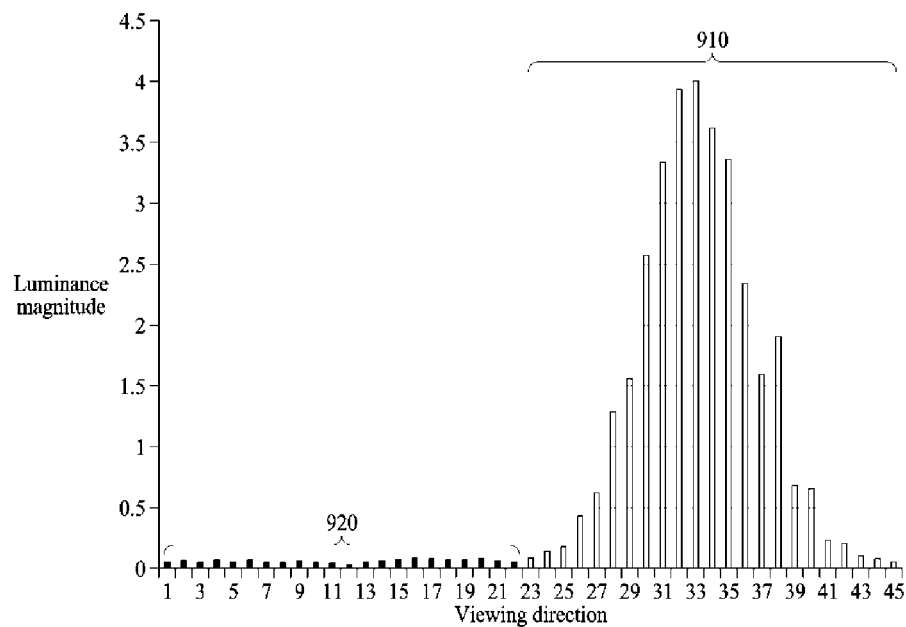

FIG. 9A illustrates a relative luminance magnitude of an image for each of viewing directions that is viewed by a right eye of a viewer of an autostereoscopic 3D display device without applying a luminance weight. Referring to FIG. 9A, it is estimated that the right eye is located close to a viewing direction 33. The viewing directions used herein may be obtained by classifying a viewing region based on a location of the autostereoscopic 3D display device into a plurality of viewing directions in which the viewer may view a 3D image output from the autostereoscopic 3D display device. Display pixels corresponding to viewing directions 23 through 45 that are closer to the right eye than the left eye may output an image pixel value of a right-view image. Display pixels corresponding to viewing directions 1 through 22 that are closer to the left eye than the right eye may output an image pixel value of a left-view image. In addition to a luminance component 910 of the right-view image, a portion of a luminance component 920 of the left-view image may also be viewed by the right eye. The luminance component 920 of the left-view image that is viewed by the right eye may cause a crosstalk. Such a crosstalk may be reduced using a luminance weight described herein.

Figure 9B:
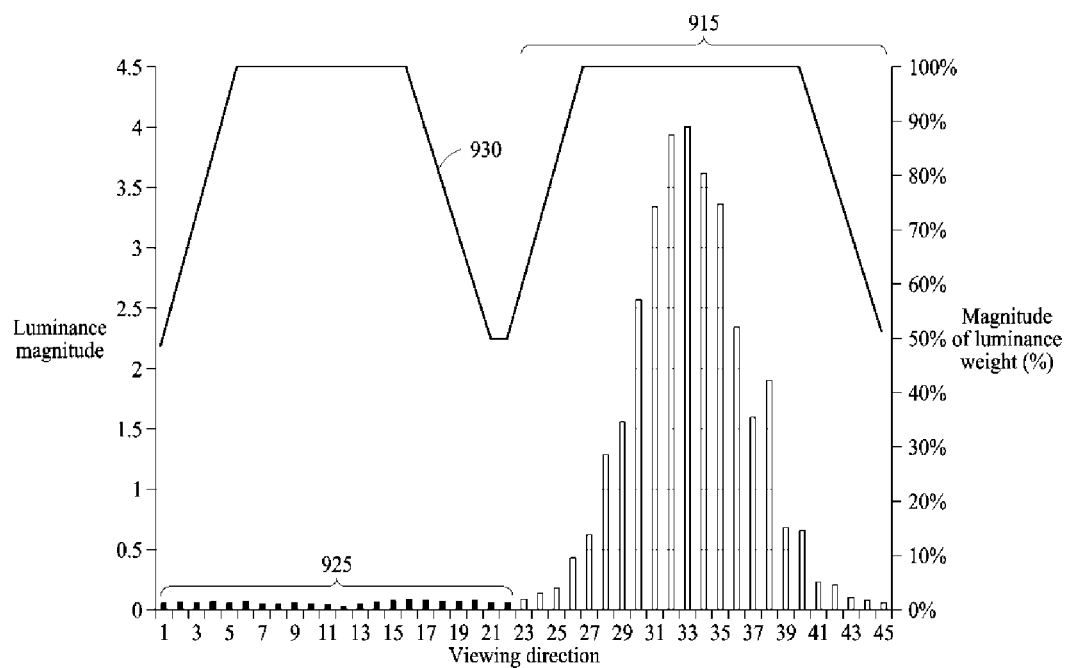

FIG. 9B illustrates a magnitude of a luminance weight to be applied for each of viewing directions, and a magnitude of a luminance component of a right-view image and a magnitude of a luminance component of a left-view image for each of the viewing directions that are viewed at a location of a right eye when the luminance weight is applied. FIG. 9B also illustrates a graph 930 indicating a continuous magnitude of a luminance weight to be applied to display pixels based on a ray direction. FIG. 9B also illustrates a luminance component 915 of the right-view image in each viewing direction that is viewed at the location of the right eye, and a luminance component 925 of the left-view image in each viewing direction that viewed at the location of the right eye, when the luminance weight is applied. When a ray direction of a display pixel is close to the left eye or the right eye, a 100% luminance weight may be applied. When the ray direction is around a middle location between the left eye and the right eye, or a viewing direction 22, a luminance weight with a low magnitude, for example, 50%, may be applied. To display pixels located between a location at which a ray direction is close to the left eye or the right eye and the middle location between the left eye and the right eye, a linearly decreasing luminance weight may be applied. In addition, a luminance weight with a low magnitude may also be applied to display pixels having ray directions that are farther away from the locations of the left eye and the right eye. By applying such a luminance weight, the luminance component 920 of the left-view image that is viewed by the right eye may be reduced, and thus the crosstalk may also be reduced.

Figure 10:
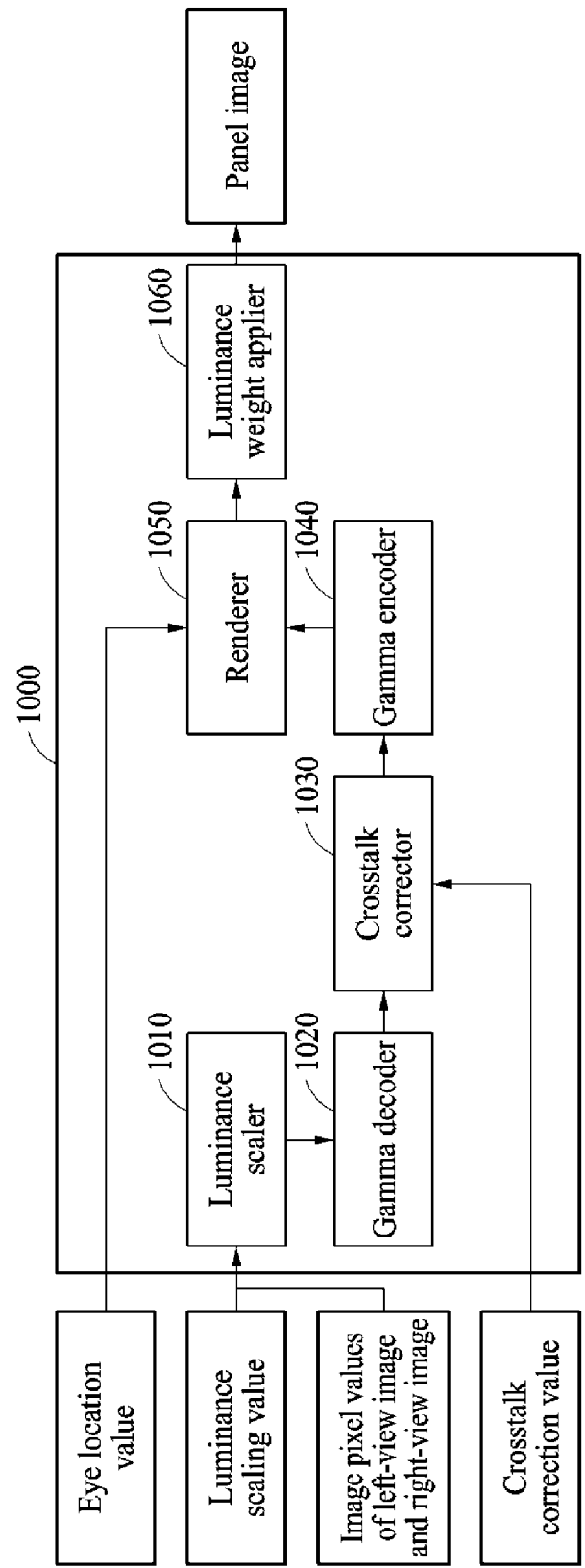
FIG. 10 is a diagram illustrating a 3D image rendering apparatus according to an example embodiment.

FIG. 10 is a diagram illustrating a 3D image rendering apparatus according to an example embodiment.

Referring to FIG. 10, a 3D image rendering apparatus 1000 may generate a panel image to be transmitted to a display panel based on input information. The input information may include, for example, an eye location value detected by an eye location detector, a luminance scaling value, an image pixel value of a left-view image and an image pixel value of a right-view image, and a crosstalk correction value. The luminance scaling value and the crosstalk correction value may be adjusted in magnitude thereof while a viewer is viewing a resulting image. The 3D image rendering apparatus 100 may generate the panel image with a reduced crosstalk component by applying a luminance weight to an image pixel value based on a ray direction of a display panel and locations of both eyes of the viewer. The 3D image rendering apparatus 1000 may perform such an image processing on each of image pixels of the panel image, and the image processing may be performed, in parallel, on the image pixels.

As illustrated in FIG. 10, the 3D image rendering apparatus 1000 includes a luminance scaler 1010, a gamma decoder 1020, a crosstalk corrector 1030, a gamma encoder 1040, a renderer 1050, and a luminance weight applier 1060. The 3D image rendering apparatus 1000 may be included in a 3D image providing apparatus described herein.

The luminance scaler 1010 may adjust a luminance range of image pixel values of an entire left-view image and a luminance range of image pixel values of an entire right-view image based on a predefined luminance scaling value. According to an example embodiment, the luminance scaler

1010 may linearly convert the luminance ranges based on a minimum luminance value and a maximum luminance value that are defined in the luminance scaling value. Through such a process described in the foregoing, a luminance range of image pixels may be reduced.

The gamma decoder 1020 may perform gamma decoding to convert an image pixel value with the adjusted luminance range in an RGB color space to a luminance space. The gamma decoding may be performed because a crosstalk component is added to both eyes of the viewer based on a luminance value of a display pixel, not on the image pixel value.

The crosstalk corrector 1030 may correct a crosstalk to adjust a luminance value of each of image pixels of the left-view image and the right-view image based on the crosstalk correction value, which is information of a magnitude of a crosstalk desired to be reduced. The crosstalk corrector 1030 may subtract a luminance value corresponding to the crosstalk correction value from a luminance value of each of the image pixels. For example, when the crosstalk correction value is 3%, the crosstalk corrector 1030 may subtract 3% from a luminance value of each of all the image pixels. Thus, an offset crosstalk component that may cause the crosstalk may be reduced.

The gamma encoder 1040 may convert, from the luminance space to the RGB color space through gamma encoding, the image pixel value on which the crosstalk correction is performed. Thus, an image pixel value of a color value to which the crosstalk correction value is applied may be obtained. According to an example, when the gamma decoding and the gamma encoding are performed on each image pixel, a gamma curve of each of RGB colors may be used or a single gamma curve may be used to reduce a color distortion.

The renderer 1050 may allocate the image pixel value on which the crosstalk correction is performed to each display pixel based on respective eye location values of both eyes of the viewer. The renderer 1050 may determine whether an image pixel value to be displayed by each display pixel in a 3D rendering process is of the left-view image or the right-view image, based on a ray direction of each display pixel and the locations of the left eye and the right eye. When a ray direction of a display pixel is closer to the left eye than the right eye, the renderer 1050 may allocate the image pixel value of the left-view image to the display pixel. Conversely, when the ray direction is closer to the right eye than the left eye, the renderer 1050 may allocate the image pixel value of the right-view image to the display pixel. To estimate a closeness between a ray direction of a display pixel and the location of the left eye, the renderer 1050 may compare a difference between the ray direction of the display pixel and a direction from the display pixel towards the left eye, and a difference between the ray direction of the display pixel and a direction from the display pixel towards the right eye.

The luminance weight applier 1060 may determine a luminance weight corresponding to each display pixel based on a ray direction of each display pixel and an eye location value, and apply the determined luminance weight to an image pixel value corresponding to each display pixel. According to an example embodiment, the luminance weight may increase when a ray direction is close to one of the eyes, and decrease when the ray direction is far away from both eyes or close to a middle location between the eyes. For example, when a ray direction of a display pixel is close to the location of the left eye or the right eye, the luminance weight applier 1060 may allocate a luminance weight to the display pixel to maintain an original luminance value of a corresponding image pixel value. When a ray direction of a display pixel is far away from the locations of the left eye and the right eye, or close to the middle location between the left eye and the right eye, the luminance weight applier 1060 may allocate a luminance weight to the display pixel to reduce a luminance value of a corresponding image pixel value.

A difference between a ray direction of a display pixel and a direction from the display pixel towards the left eye, and a difference between the ray direction and a direction from the display pixel towards the right eye being similar to each other may indicate that the ray direction of the display pixel is not close to either the left eye or the right eye. In addition, an image pixel value to be output by the display pixel may contribute less to a luminance component of a 3D image to be viewed by the viewer, and it is more likely that the image pixel value would be a crosstalk component. Thus, by decreasing a luminance value of the image pixel value by applying a relatively low luminance weight, such a crosstalk component may be reduced. Conversely, a difference between the ray direction of the display pixel and the direction from the display pixel towards the left eye, and a difference between the ray direction and the direction from the display pixel towards the right eye being not similar to each other may indicate that the ray direction of the display pixel is close to one of the left eye and right eye. In addition, it is highly likely that the image pixel value to be output by the display pixel may contribute more to a luminance component of the 3D image to be viewed by the viewer. In such a case, a luminance value of the image pixel value may be equal to or similar to an original luminance value based on a relatively high luminance weight.

Thus, the luminance weight applier 1060 may generate a panel image with a reduced crosstalk component by applying, to an image pixel value corresponding to each display pixel, a luminance weight allocated to each display pixel.

Figure 11:
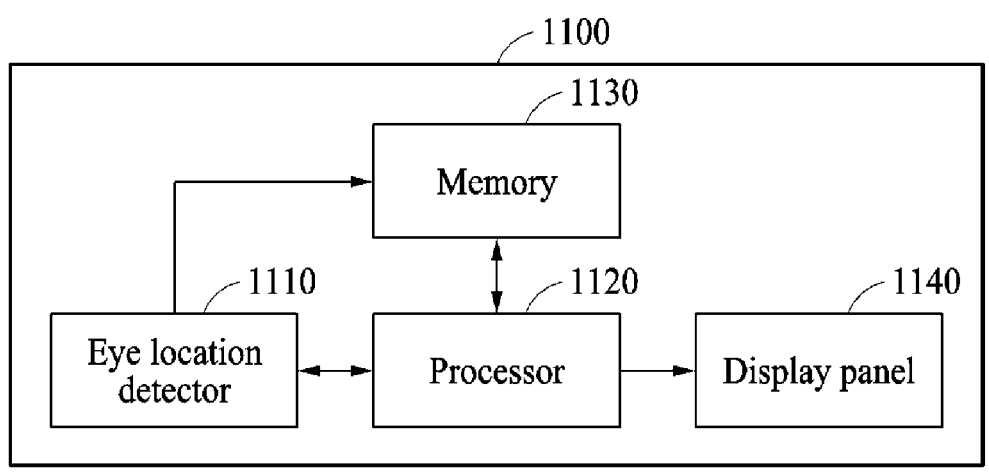
FIG. 11 is a diagram illustrating a configuration of a 3D image providing apparatus according to an example embodiment.

FIG. 11 is a diagram illustrating a configuration of a 3D image providing apparatus according to an example embodiment.

Referring to FIG. 11, a 3D image providing apparatus 1100 includes an eye location detector 1110, a processor 1120, a memory 1130, and a display panel 1140.

The eye location detector 1110 may detect an eye location of a viewer. The eye location detector 1110 may include a camera that is included in the 3D image providing apparatus 1100 and configured to track a viewpoint of the viewer in real time. According to an example embodiment, the eye location detector 1110 may detect feature points corresponding to an eye of the viewer from an image captured by the camera, and determine a location of the eye of the viewer based on locations of the detected feature points. For example, the eye location detector 1110 may determine a center location of feature points corresponding to a pupil of a left eye of the viewer to be a location of the left eye, and a center location of feature points corresponding to a pupil of a right eye of the viewer to be a location of the right eye. The eye location detector 1110 may also determine the location of the left eye and the location of the right eye using a neural network that is trained to output each of the location of the left eye and the location of the right eye from an image including a face region of the viewer. However, example embodiments are not limited thereto, and the detecting of the eye location is not limited to the examples described in the foregoing, and the eye location detector 1110 may detect the eye location of the viewer using other various methods. The eye location detector 1110 may then transmit an image captured or the calculated eye location to the processor 1120.

The processor 1120 may control the 3D image providing apparatus 1100, and perform operations described with reference to FIGS. 1 through 10. For example, the processor 1120 may perform operations described with reference to FIGS. 3 through 5. The processor 1120 may generate a panel image based on the detected eye location. The processor 1120 may configure the panel image based on images of different viewpoints such that the images of the different viewpoints may be viewed by the left eye and the right eye, respectively, of the viewer. Here, the processor 1120 may determine a luminance weight to be allocated to each display pixel based on a ray direction of a ray output from each display pixel and locations of both eyes of the viewer, and generate the panel image with a reduced crosstalk component by applying the determined luminance weight to an image pixel value.

In addition, the processor 1120 may perform functions of components of the 3D image rendering apparatus 1000 described with reference to FIG. 10. The processor 1120 may be variously embodied in a single processor, a multi-processor, a hardware accelerator (HWA), a graphic processing unit (GPU), or a combination thereof.

The memory 1130 may store viewpoint images, for example, a stereo image of a left-view image and a right-view image, a panel image, instructions for operations of the processor 1120, and data such as various functions, equations, and operation results. In addition, the memory 1130 may transmit related data to the processor 1120, and other data stored in the memory 1130 to the processor 1120.

The display panel 1140 may convert the panel image generated by the processor 1120 to a 3D image, and output the 3D image. The display panel 1140 may include a 3D optical device to convert the panel image in a two-dimensional (2D) form to the 3D image, for example, a parallax barrier and a lenticular lens.

Figure 12:
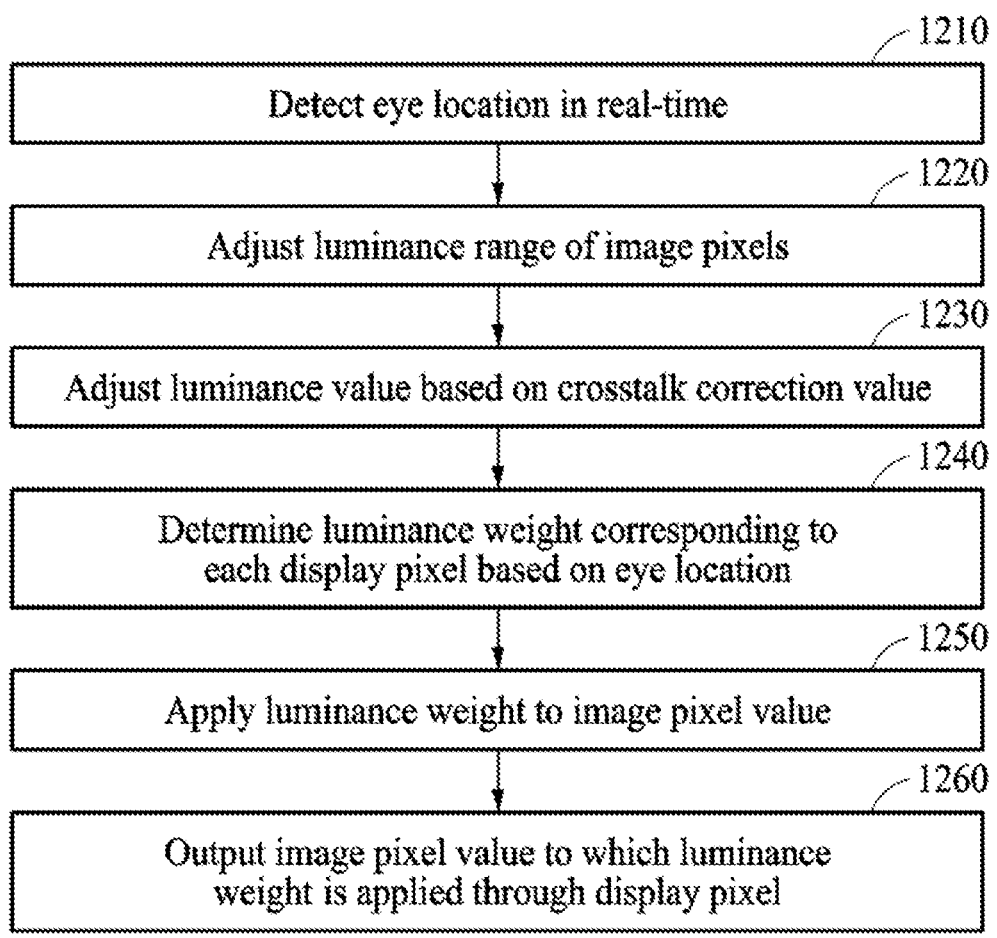
FIG. 12 is a flowchart illustrating a 3D image providing method according to an example embodiment.

FIG. 12 is a flowchart illustrating a 3D image providing method according to an example embodiment.

Referring to FIG. 12, in operation 1210, a 3D image providing apparatus detects an eye location of a viewer. The 3D image providing apparatus determines the eye location of the viewer by capturing an image in front of the 3D image providing apparatus using a camera, and analyzing the captured image. For example, the 3D image providing apparatus may detect a feature point associated with an eye region in the image captured by the camera, and determine the eye location of the viewer based on a location of the detected feature point. In operation 1220, the 3D image providing apparatus adjusts a luminance range of image pixels of a left-view image and a luminance range of image pixels of a right-view image based on a predefined luminance scaling value to maintain a margin range. In operation 1230, the 3D image providing apparatus adjusts a luminance value of each of the image pixels of the left-view image and the right-view image with the luminance range adjusted in operation 510 based on a predefined crosstalk correction value.

In operation 1240, the 3D image providing apparatus determines a luminance weight corresponding to the display pixel based on a ray direction of the display pixel and the eye location detected in operation 1210. For example, when the ray direction of the display pixel is closer to the location of the left eye or the right eye, the 3D image providing apparatus may allocate a greater luminance weight to the display pixel. Conversely, when the ray direction of the display pixel is farther away from the location of the left eye and the location of the right eye, or the ray direction of the display pixel is closer to a middle location between the left eye and the right eye, the 3D image providing apparatus may allocate a lower luminance weight to the display pixel.

In operation 1250, the 3D image providing apparatus applies the luminance weight determined in operation 1240 to the image pixel value corresponding to the display pixel. A luminance of the image pixel value to be output through the display pixel may be adjusted based on the luminance weight applied to the image pixel value. For example, in a case of a 100% luminance weight, an image pixel value with an original luminance may be output.

In operation 1260, the 3D image providing apparatus outputs the image pixel value to which the luminance weight is applied through the display pixel. As described above, the 3D image providing apparatus may determine a luminance weight corresponding to each display pixel and output an image pixel value to which the determined luminance weight is applied through a corresponding display pixel to output a 3D image with a reduced crosstalk component.

The apparatuses and units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular, however, a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments that accomplish the examples disclosed herein can be easily construed by programmers skilled in the art to which the examples pertain based on and using the flow diagrams and block diagrams of the figures and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A three-dimensional (3D) image providing method comprising:
   detecting an eye location of a viewer, the eye location comprising a location of a right eye of the viewer and a location of a left eye of the viewer; and
   providing a 3D image based on the detected eye location, wherein the providing of the 3D image comprises:
      determining an image pixel value corresponding to a display pixel included in a display panel;
      determining a luminance weight corresponding to the display pixel based on a ray direction of a ray output from the display pixel and the detected eye location;
      applying the determined luminance weight to the image pixel value corresponding to the display pixel; and
      outputting, through the display pixel, the image pixel value with the determined luminance weight applied thereto,
   wherein the determining of the luminance weight further comprises determining the luminance weight based on at least one of a first reference value corresponding to a distance between a pass-through point of the ray and the location of the left eye of the viewer, or a second reference value corresponding to a distance between the pass-through point of the ray and the location of the right eye of the viewer, and
   wherein the pass-through point of the ray is a location where the ray crosses a line passing through the location of the left eye of the viewer and the location of the right eye of the viewer, and the pass-through point of the ray is spaced apart from the left eye of the viewer and the right eye of the viewer.

2. The 3D image providing method of claim 1, wherein the determining of the luminance weight comprises determining a predefined luminance weight among a plurality of predefined luminance weights to be the luminance weight, based on the at least one of the first reference value or the second reference value.

3. The 3D image providing method of claim 1, wherein the determining of the luminance weight comprises based on the first reference value being included in a first reference value range that is based on the location of the left eye or the second reference value being included in a second reference value range that is based on the location of the right eye, determining a first luminance weight to be the luminance weight corresponding to the display pixel.

4. The 3D image providing method of claim 3, wherein the determining of the luminance weight comprises based on the first reference value being outside of the first reference value range and the second reference value being outside of the second reference value range, determining a second luminance weight to be the luminance weight corresponding to the display pixel, and
   wherein the first luminance weight is greater than the second luminance weight.

5. The 3D image providing method of claim 3, wherein a magnitude of the first reference value range is equal to a magnitude of the second reference value range.

6. The 3D image providing method of claim 1, wherein the first reference value corresponds to a difference between the ray direction and a direction of a line from the display pixel towards the location of the left eye, and
   the second reference value corresponds to a difference between the ray direction and a direction of a line from the display pixel towards the location of the right eye.

7. The 3D image providing method of claim 6, wherein the first reference value is determined based on an angle between the ray direction and the direction of the line from the display pixel towards the location of the left eye, or the distance between the pass-through point of the ray direction and the location of the left eye, and
   the second reference value is determined based on an angle between the ray direction and the direction of the line from the display pixel towards the location of the right eye, or the distance between the pass-through point of the ray direction and the location of the right eye.

8. The 3D image providing method of claim 1, wherein a luminance of the image pixel value to be output through the display pixel is adjusted based on the luminance weight to be applied to the image pixel value.

9. The 3D image providing method of claim 1, wherein the determining of the image pixel value comprises allocating, to the display pixel, an image pixel value of one of a left-view image and a right-view image, based on the detected eye location.

10. The 3D image providing method of claim 9, wherein the determining of the image pixel value further comprises:
    adjusting a left luminance range of image pixels of the left-view image and a right luminance range of image pixels of the right-view image, based on a predefined luminance scaling value; and
    adjusting a luminance value of each of the image pixels of the left-view image with the adjusted left luminance range and a luminance value of each of the image pixels of the right-view image with the adjusted right luminance range, based on a predefined crosstalk correction value.

11. The 3D image providing method of claim 10, wherein the determining of the image pixel value further comprises:
    based on the distance between the pass-through point of the ray direction and a location of the left eye of the viewer being smaller than the distance between the pass-through point of the ray direction and a location of the right eye of the viewer, allocating the image pixel value of the left-view image with the adjusted left luminance value to the display pixel; and
    based on the distance between the pass-through point of the ray direction and the location of the right eye being smaller than the distance between the pass-through point of the ray direction and the location of the left eye, allocating the image pixel value of the right-view image with the adjusted right luminance value to the display pixel.

12. A non-transitory computer-readable storage medium storing instructions that, when executed by a processor, cause the processor to perform the 3D image providing method of claim 1.

13. A three-dimensional (3D) image providing apparatus comprising:
    an eye location detector configured to detect an eye location of a viewer, the eye location comprising a location of a right eye of the viewer and a location of a left eye of the viewer;
    a processor configured to generate a panel image based on the detected eye location; and
    a display panel configured to output a 3D image based on the generated panel image,
    wherein the processor is further configured to:
        determine a luminance weight corresponding to a display pixel of the display panel based on a ray direction of a ray output from the display pixel and the detected eye location;
        apply the determined luminance weight to an image pixel value corresponding to the display pixel; and
        generate the panel image based on the image pixel value with the luminance weight applied thereto,
    wherein the processor is further configured to determine the luminance weight based on at least one of a first reference value corresponding to a distance between a pass-through point of the ray and the location of the left eye of the viewer, or a second reference value corresponding to a distance between the pass-through point of the ray and the location of the right eye of the viewer, and
    wherein the pass-through point of the ray is a location where the ray crosses a line passing through the location of the left eye of the viewer and the location of the right eye of the viewer, and the pass-through point of the ray is spaced apart from the left eye of the viewer and the right eye of the viewer.

14. The 3D image providing apparatus of claim 13, wherein the processor is further configured to determine a predefined luminance weight among a plurality of predefined luminance weights to be the luminance weight corresponding to the display pixel, based on at least one of the first reference value or the second reference value.

15. The 3D image providing apparatus of claim 13, wherein the processor is further configured to adjust a left luminance range of image pixels of a left-view image and a right luminance range of image pixels of a right-view image, based on a predefined luminance scaling value, and
    adjust a luminance value of each of the image pixels of the left-view image based on the adjusted left luminance range and a luminance value of each of the image pixels of the right-view image based on the adjusted right luminance range, based on a predefined crosstalk correction value.

16. The 3D image providing apparatus of claim 15, wherein the processor is further configured to allocate an image pixel value of the left-view image with the adjusted left luminance value to the display pixel, based on the distance between the pass-through point of the ray direction and the location of the left eye of the viewer being smaller than the distance between the pass-through point of the ray direction and the location of the right eye of the viewer, and allocate an image pixel value of the right-view image with the adjusted right luminance value to the display pixel, based on the distance between the pass-through point of the ray direction and the location of the right eye being smaller than the distance between the pass-through point of the ray direction and the location of the left eye.

17. The 3D image providing apparatus of claim 13, wherein the display panel comprises a parallax barrier or a lenticular lens.

18. A three-dimensional (3D) image providing method comprising:
    detecting a right eye location and a left eye location of a viewer; and
    providing a 3D image based on the detected right eye location and the detected left eye location,
    wherein the providing of the 3D image comprises:
        determining an image pixel value corresponding to a display pixel included in a display panel by allocating an image pixel value of one of a left-view image and a right-view image to the display pixel, based on the detected right eye location and the detected left eye location;
        adjusting a left luminance range of image pixels of the left-view image and a right luminance range of image pixels of the right-view image, based on a predefined luminance scaling value; and
        adjusting a luminance value of each of the image pixels of the left-view image with the adjusted left luminance range and a luminance value of each of the image pixels of the right-view image with the adjusted right luminance range, based on a predefined crosstalk correction value;
        determining a luminance weight corresponding to the display pixel based on a ray direction of a ray output from the display pixel and the detected right eye location and the detected left eye location;
        applying the determined luminance weight to the image pixel value corresponding to the display pixel; and
        outputting, through the display pixel, the image pixel value with the determined luminance weight applied,
    wherein the determining of the luminance weight further comprises determining the luminance weight based on at least one of a first reference value corresponding to a distance between a pass-through point of the ray and the detected left eye location of the viewer, or a second reference value corresponding to a distance between the pass-through point of the ray and the detected right eye location of the viewer, and
    wherein the pass-through point of the ray is a location where the ray crosses a line passing through the detected left eye location of the viewer and the detected right eye location of the viewer, and the pass-through point of the ray is spaced apart from the detected left eye location of the viewer and the detected right eye location of the viewer.

19. The 3D image providing method of claim 18, wherein the determining of the image pixel value further comprises:
    based on the distance between the pass-through point of the ray direction and the detected left eye location being smaller than the distance between the pass-through point of the ray direction and the detected right eye location, allocating the image pixel value of the left-view image with the adjusted left luminance value to the display pixel; and
    based on the distance between the pass-through point of the ray direction and the detected right eye location being smaller than the distance between the pass-through point of the ray direction and the detected left eye location, allocating the image pixel value of the right-view image with the adjusted right luminance value to the display pixel.

* * * * *